Feb. 22, 1966 H. BACHER ETAL 3,237,133

LINEAR VARIABLE LOSSY LINE ATTENUATOR

Filed Feb. 27, 1964 2 Sheets-Sheet 1

INVENTORS
Helmut Bacher
John E. Ebert

BY Max L. Libman

ATTORNEY

Feb. 22, 1966 H. BACHER ETAL 3,237,133

LINEAR VARIABLE LOSSY LINE ATTENUATOR

Filed Feb. 27, 1964 2 Sheets-Sheet 2

INVENTORS
Helmut Bacher
John E. Ebert

BY Max L. Libman

ATTORNEY

United States Patent Office 3,237,133

Patented Feb. 22, 1966

3,237,133

LINEAR VARIABLE LOSSY LINE ATTENUATOR

Helmut Bacher, Silver Spring, and John E. Ebert, Chevy Chase, Md., assignors to Weinschel Engineering Co., Gaithersburg, Md., a corporation of Delaware Filed Feb. 27, 1964, Ser. No. 347,739
2 Claims. (Cl. 333—81)

This invention relates to attenuators for use in very high frequency electrical systems, typically in the range from 1,000 to at least 10,000 megacycles, and has for its primary object the provision of a variable lossy line attenuator with a substantially linear characteristic.

Known types of variable coaxial attenuators for high frequency work, which are available currently, rely upon a decrease in the field by means of resistance material brought into the field in order to vary the attenuation. Typically, the resistance element is moved until it comes into the field and absorbs energy. Other attenuators rely upon the principle of the strip line, typically two conductive strips separated by a dielectric, which is gradually withdrawn while a strip is inserted in its place which has lossy material for absorbing R-F energy to produce attenuation. One difficulty with known devices of this type is that they are frequency sensitive and must be calibrated at a particular frequency of interest.

It is a major object of the present invention to provide a variable attenuator which has a substantially flat frequency characteristic at all settings over a two or three octave frequency range; in other words, a very flat attenuation vs. frequency characteristic, which has heretofore been very difficult to obtain in variable attenuators. A further object is to provide a variable attenuator settable to different attenuation values on a uniform scale having approximately equal intervals for equal increments in decibels. Other advantages include providing a simple, rugged, and highly reproducible variable attenuator with a very small minimum (or "zero" db) loss.

The above and other objects are accomplished according to the invention by providing a lossy line coaxial attenuator, which relies upon the resistance of one of the coaxial conductors to decrease the signal strength by an amount which varies more or less directly with the axial length of the amount of lossy line which is electrically inserted into the circuit as the attenuator is adjusted. Typically, an attenuator according to the invention consists of an inner conductor, one-half of which, considered axially (along its length), is essentially lossless, while the other half is a coating of lossy material on a dielectric base. A thin metal sleeve is moved axially along this coating in such fashion that a variable portion of the coating is effectively engaged by the sleeve as the sleeve is moved axially, while a portion of the sleeve remains at all times in current conductive relationship with the lossless conductor portion. For a better match, the forward end of the sleeve is preferably made to taper in such fashion that a variable portion of the sleeve circumference engages the lossy portion of the inner conductor as the sleeve is moved toward the lossy portion.

The specific nature of the invention as well as other objects and advantages thereof will clearly appear from a description of a preferred embodiment as shown in the accompanying drawings, in which.

Figure 1:
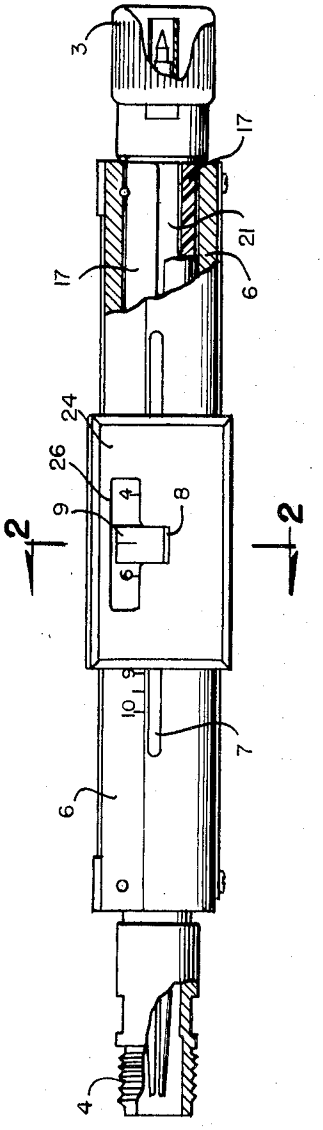
FIG. 1 is a longitudinal view partly broken away, of an attenuator according to the invention.
Figure 3:
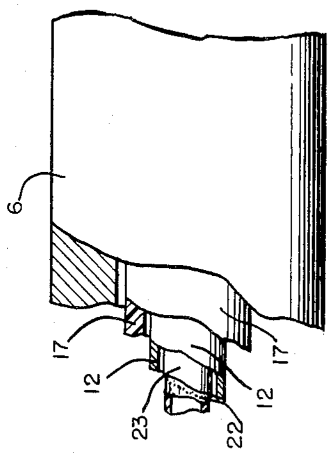
FIG. 3 is a view of a portion of the barrel, partly broken away, to show the successive concentric layers of material.
Figure 2:
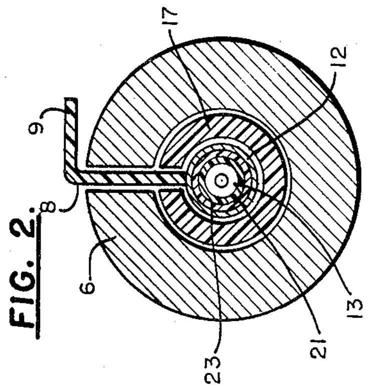
FIG. 2 is a sectional view taken on 2—2 of FIG. 1.
Figure 6:
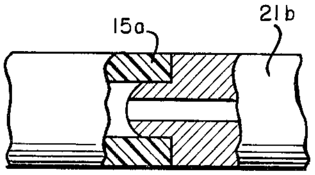
FIG. 6 is a detail view of an alternative form of central conductor.

Referring to FIG. 1, the attenuator is shown as a straight coaxial line element for insertion into a typical coaxial line, for which purpose it is provided with customary coaxial fittings 3 and 4. The outer coaxial conductor is preferably a length of rigid metal tubing 6 having a slot 7 through which a dielectric slider 8 extends. The exposed end of the slider is bent over at right angle to form an index tab 9, while the other end of the slider is enlarged to form a T-shaped bar 11 which is firmly fastened, as by cementing, to a very thin conductive sleeve 12, best shown in FIG. 4. Sleeve 12 slidably surrounds central conductor 13 closely, so that it can be slid from one end of the conductor to the other by means of the index tab 9. Elements 8 and 9 are preferably formed from a piece of clear plastic such as Plexiglas, upon which an index line may be placed so that the axial position of the slider along the attenuator can be accurately read with reference to a scale suitably marked on the outer barrel of the attenuator. A slit tube 17 of high quality insulating material is preferably placed between the outer coaxial conductor 6 and the inner conductor 13 with its slider 12. The purpose of this dielectric is to increase the effective electrical length of the attenuator and so reduce the lower frequency of operation for a given physical length. This tube may be in one or more sections for ease of assembly, and due to its slit construction will not interfere with axial motion of the slider 8. The central conductor 13 is provided with standard bullet connections 18, 19 at its ends for engagement with conventional connector means on the coaxial connectors 3 and 4. Central conductor 13 is preferably made in the form of a ceramic tube 15, one side of which, considered axially, is coated with a highly conducting lossless material such as silver, as indicated at 21; the remaining axial length of element 13 is coated with a lossy resistance coating 22. A coating of insulating lacquer 23 is applied over at least resistance coating 22, and may also be applied if desired over the highly conductive coating 21. The purpose of the lacquer coating 23 is chiefly to prevent undue abrasion of the conductive coatings 22 due to frictional engagement with the slider 12. At the frequency range for which this attenuator is intended, namely in the order of 1,000 megacycles and up, actual conductive contact between the slider 12 and the coatings 21 and 22 is not necessary, since the capacitive reaction between the elements is extremely low. However, in some cases it has been found that a good direct contact between the sleeve 12 and the conductor portion 21 tends to improve the linearity of the attenuator, and it may therefore be preferable to eliminate the lacquer coating over the conductive portion 21 where this is a consideration. It is understood that the conductive portion 21 may also be in the form of a highly conductive metal tube, such as silver. In this case, the metal tube *21b* may be joined to the ceramic tube *15a* as shown in FIG. 6.

A drive carriage 24 with a holding slot is a convenient way of moving slider 8. The carriage is preferably provided with a cut-out portion 26 to facilitate reading of the scale setting of the attenuator. The face of the carriage may also carry suitable information on the calibration frequency, etc.

Although the attenuator is shown as a straight-line unit for use in a typical coaxial conductor line, it will be understood that the attenuator element could also be curved into a circular or partially circular shape to conserve axial space where necessary, and in this case the slider cuold be operated by a centrally located arm bearing a knob for manual manipulation.

Sleeve 12 is preferably made very thin, typically with a 0.0015 inch wall in a unit approximately four inches in length, to insure that the impedance of the coaxial line is not significantly altered by the sleeve member. The sleeve is provided with a taper portion 26 so that the transition from the lossless portion to the resistive portion at the radio frequency range involved occurs very gradually. This is useful both to minimize mismatch and to avoid discontinuities in the characteristic curve or attenuation vs. sleeve displacement.

Figure 5:
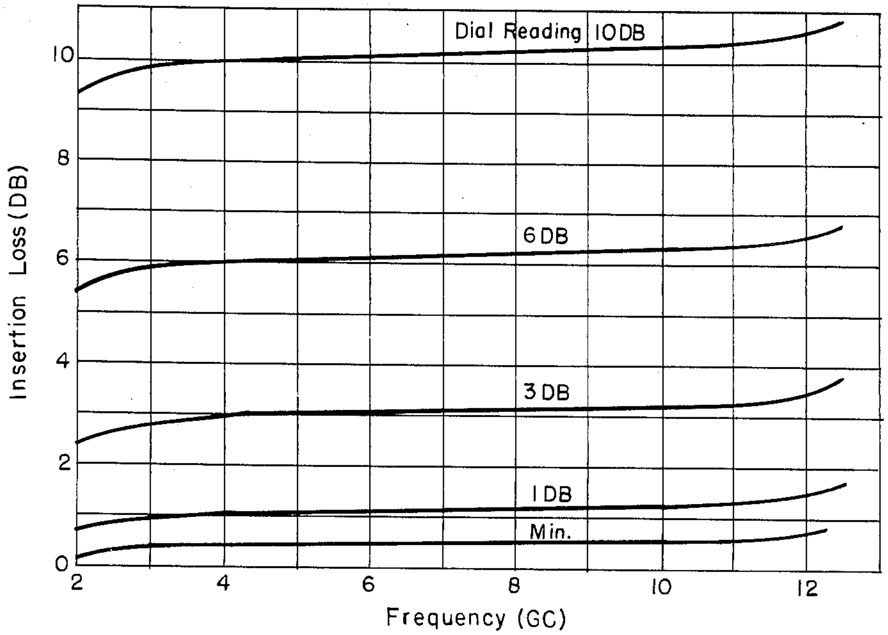
FIG. 5 is a chart showing the frequency characteristic of a typical attenuator at various settings.

FIG. 5 shows a typical set of curves of frequency (in thousands of megacycles) vs. insertion loss at various settings of the attenuator.

Figure 7:
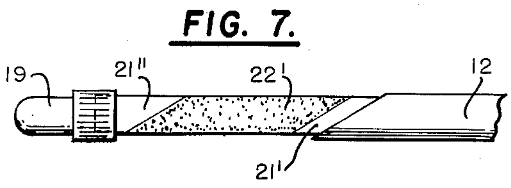
FIG. 7 shows a modified form of attenuator.

FIG. 7 shows an alternative form in which the end of the sleeve 12 is tapered as before, but the resistive element 22' is not cut off square, but is also tapered at both ends to avoid abrupt discontinuities. The conductive surface 21' is accordingly also provided at the left end of the unit as shown at 21'', so that the resistive element 22' is completely shorted out when the sleeve is pushed over to its extreme left-hand position.

Figure 4:
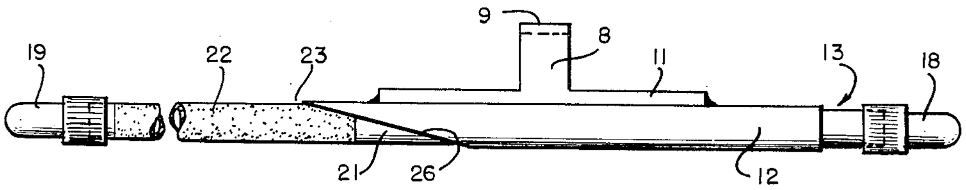
FIG. 4 is a longitudinal view of a sub-assembly including the central conductor and the movable sleeve.

The use of a tapered resistive portion at the left-hand end of the resistive element (the end nearest the bullet conductor 19) is, of course, also possible in the modification of FIG. 4.

It will be understood that if finer control of the slider 8 is desired, a conventional rack and pinion mechanism, or any other motion amplifying mechanism can be employed.

It will be apparent that the embodiments shown are only exemplary and that various modifications can be made in construction and arrangement within the scope of our invention as defined in the appended claims.

We claim:

1. An ultra-high frequency variable coaxial attenuator comprising (a) an outer coaxial conductor of a fixed length, (b) an inner coaxial element concentric therewith and spaced therefrom, (c) said inner conductor comprising a highly conductive section and a resistive section, (d) and a slidable conductive sleeve surrounding and axially movable along said inner element to vary the attenuation by exposing more or less of the resistive section, (e) said resistive section comprising a resistive film on the surface of a dielectric base forming part of said inner element, (f) matching means comprising a tapered cut on the end of the sliding sleeve engaging the resistive section on a bias, the edge of said tapered cut lying substantially in a slant plane which intersects the axis of the attenuator at an acute angle, (g) the line of connection between the resistive film and the conductive section of the inner conductor being on a bias with respect to the axial direction of the inner conductor, said line lying substantially in a plane which is parallel to said slant plane.

2. The invention according to claim 1, and means mechanically coupling said sleeve to the outer surface of the outer coaxial conductor to permit axial sliding motion of said conductive sleeve.

References Cited by the Examiner

UNITED STATES PATENTS

| | | | |
|---|---|---|---|
| 2,423,461 | 7/1947 | Meahl | 333—81 |
| 2,510,614 | 6/1950 | Weber et al. | 333—81 |
| 2,689,294 | 1/1954 | Weber et al. | 333—81 |
| 3,105,211 | 9/1963 | Norman | 333—81 |
| 3,181,094 | 4/1965 | Hotine | 333—97 |

ELI LIEBERMAN, *Acting Primary Examiner.*

HERMAN KARL SAALBACH, *Examiner.*